United States Patent [19]

Romagnoli

[11] Patent Number: 4,472,922

[45] Date of Patent: Sep. 25, 1984

[54] SYSTEM FOR MONITORING THE OPERATION OF A MACHINE FOR PRODUCING BLISTER PACKAGES OR THE LIKE

[75] Inventor: Andrea Romagnoli, San Lazzaro di Savena, Italy

[73] Assignee: IMA - Industria Macchine Automatiche-S.p.A., Ozzano Emilia, Italy

[21] Appl. No.: 341,325

[22] Filed: Jan. 21, 1982

[30] Foreign Application Priority Data

Jan. 23, 1981 [IT] Italy ................... 3315 A/81

[51] Int. Cl.³ .................. B65B 57/00; B65B 57/18
[52] U.S. Cl. .......................... 53/53; 53/65; 53/508
[58] Field of Search ............. 53/51, 52, 53, 65, 75, 53/508; 83/80, 365; 226/29

[56] References Cited

U.S. PATENT DOCUMENTS 3,238,691 3/1966 Miller et al. .............. 53/51 X
3,445,981 5/1969 Tatsu Hori ................ 53/53 X
3,889,447 6/1975 Garris ...................... 53/53

Primary Examiner—Robert L. Spruill
Assistant Examiner—Donald R. Studebaker
Attorney, Agent, or Firm—Karl F. Ross

[57] ABSTRACT

A preheated carrier strip of thermoplastic material passes successively through a molding station in which blisters are formed therein, a filling station in which goods to be packaged are introduced into these blisters, a sealing station in which a metallic cover strip is fused onto the carrier strip for hermetically closing the filled blisters, and a cutting station in which the resulting composite tape is divided into individual packages each having one or more rows of blisters. The tape is positively entrained by the two transport rollers, which have peripheral indentations engaged by its blisters, and forms a loop of variable length between these rollers to allow for their instantaneous speed differences. A first photodetector scans the carrier strip between the filling and sealing stations and, on sensing an empty blister, causes the actuation of a perforator punching a hole into a part of the cover strip subsequently coming to overlie the incompletely filled row of blisters. An error pulse simultaneously loaded into a shift register actuates, after a suitable delay, a sorter downstream of the cutting station to eliminate the defective package from the regular machine output. A resulting control pulse, read out from an earlier stage of the shift register, causes the generation of an alarm signal if it does not coincide with a reference pulse from a second photodetector positioned to sense the punched hole between the downstream transport roller and the cutting station.

6 Claims, 2 Drawing Figures

SYSTEM FOR MONITORING THE OPERATION OF A MACHINE FOR PRODUCING BLISTER PACKAGES OR THE LIKE

FIELD OF THE INVENTION

My present invention relates to a machine for the production of so-called blister packages from a thermoplastic carrier strip which, after preheating, is subjected to a deep-drawing operation in a molding station whereupon the resulting cells or blisters are filled with goods to be packaged, these cells being then sealed by a bonding of the carrier strip to an overlying cover strip which is usually metallic.

BACKGROUND OF THE INVENTION

In such machines the forming of the blisters in the preheated and therefore readily deformable carrier strip is generally done with the aid of a source of compressed air driving portions of that strip into suitably shaped cavities or recesses of an underlying die whose bottoms are vented to the atmosphere. The die, serving as a movable mold plate, may be periodically reciprocated toward and away from a fixed abutment plate having air channels aligned with these cavities. After the deformed strip leaves the die, and upon sufficient hardening of the blisters, the latter may be engaged by stationary guides as well as by one or more peripherally indented transport rollers for advancing the strip in a precisely controlled manner through the filling and sealing stations following the molding station. After the filled blisters have been hermetically sealed by the application of the cover strip, the resulting composite tape may be divided at a cutting station into packages of one or more blisters each. The sealing station may include one or more counterrollers coacting with one of the aforementioned transport rollers to laminate the cover strip onto the underlying carrier strip, with or without the application of additional heat.

In a packaging machine of this type it is desirable to monitor the contents of cells—not necessarily formed as blisters—downstream of the filling station and to eliminate defective packages leaving the cutting station. When the carrier strip formed with the cells is of light-transmissive material, i.e. transparent or translucent, such monitoring can be conveniently performed by a photoelectric sensor. If the cover strip subsequently sealing the cells is not sufficiently light-transmissive, such a sensor will have to be positioned ahead of the sealing station. An ejector downstream of the cutting station can then be actuated by a suitably delayed error signal from the sensor.

In many instances the molding station and the cutting station operate with different candences so that the carrier strip must intermittently advance through the mold in a mode different from that required for feeding the sealed tape to the cutter. Thus, an upstream transport roller pulling the carrier strip through the molding, filling and sealing stations will not rotate in synchronism with a downstream transport roller delivering the tape to the cutting station, even though the average rate of advance will be the same at all stations. The differences in instantaneous roller speeds can be taken into account by a loop of variable length formed by the tape between the two transporters; the presence of this loop, however, may on occasion lead to a phase shift between the operating cycles of the moding and cutting stations. If the machine is equipped with a monitoring device designed to detect improperly filled blisters ahead of the upstream transporter, an ejector responsive to an error signal from the monitoring device can eliminate the defective package from the output of the cutting stage only if that error signal is delayed by precisely the time required for a blister or a row of blisters to travel from the vicinity of the monitoring device to the location of the ejector. Any phase shift of the type referred to above would then result in a malfunction.

OBJECTS OF THE INVENTION

An important object of my present invention, therefore, is to provide means in such a packaging machine for quickly detecting any phase shift along the loop in order to minimize the occurrence of malfunctions of the kind referred to.

A more particular object is to provide a simple mechanism for this purpose which can be readily installed in an existing packaging machine of the character described.

SUMMARY OF THE INVENTION

I realize these objects, in accordance with my present invention, by the provision of first sensing means disposed between the filling station and an upstream transporter for detecting the presence of an empty cell in the carrier strip, sorting means in the path of the packages severed by the cutting station for eliminating a defective package from that path in response to an error signal from the first sensing means, delay means inserted between the first sensing means and the sorting means for retarding the error signal for a time normally required for advancing to the cell from the location of that sensing means to the location of the sorting means, marking means ahead of the loop responsive to the error signal for applying a distinctive sign to the carrier strip in close proximity to an empty cell detected by the first sensing means, second sensing means disposed between the loop and the cutting station for emitting a reference pulse upon detecting the distinctive sign, anticoincidence means with respective inputs connected to the second sensing means and to another output of the delay means for normally receiving the reference pulse together with a control pulse derived from the error signal, and alarm means triggerable by the anticoincidence means upon the arrival of either of these pulses unaccompanied by the other.

When the carrier strip consists of light-transmissive material and its cells are being sealed by an opaque (e.g. metallic) cover strip, the marking means advantageously comprises a perforator adapted to punch a hole into the cover strip ahead of the sealing station; the two sensing means can then be designed as respective photodectors, one of them being disposed upstream of the sealing station to transluminate the still uncovered carrier strip while the other, positioned downstream of the cutting station, responds to the hole punched into cover strip.

The anticoincidence means may be formed by an Exclusive-OR gate or equivalent logical circuitry.

BRIEF DESCRIPTION OF THE DRAWING

The above and other features of my invention will now be described in detail with reference to the accompanying drawing in which.

SPECIFIC DESCRIPTION

Figure 1:
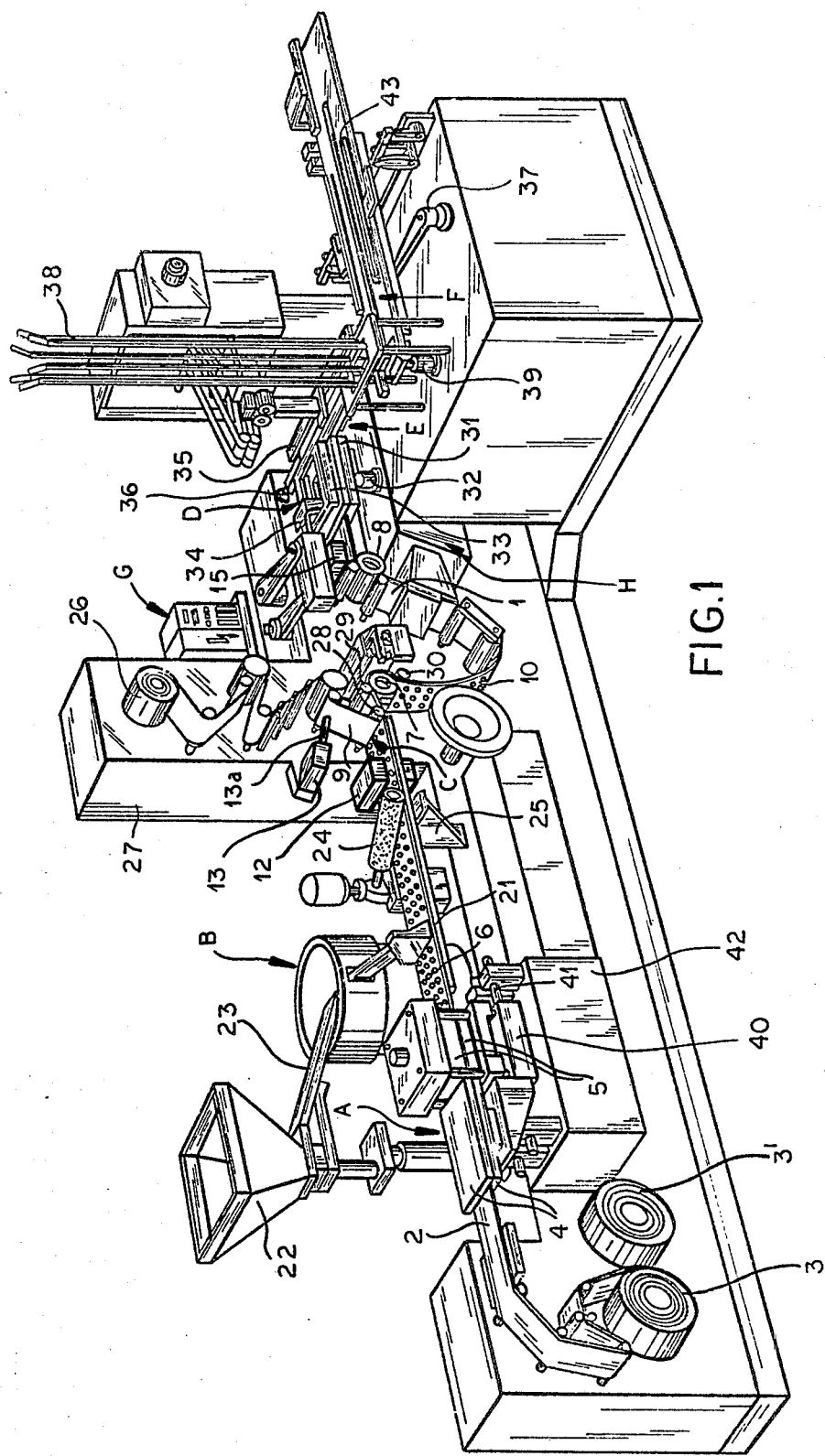
FIG. 1 is a perspective view of a packaging machine provided with a monitoring system embodying my invention.

In FIG. 1 I have shown a packaging machine, of a type largely known per se, wherein a continuously moving thermoplastic carrier strip 2 (e.g. of polyvinylchloride) advances successively through a molding station A, a filling station B and a sealing station C, thereupon passing intermittently through a cutting station D, a labeling station E and a cartoning station F. Carrier strip 2, drawn from a supply reel 3 which after exhaustion is replaced by a similar reel 3', passes through a preheating stage 4 of station A before being subjected to a deep-drawing operation in a mold 5 mounted on a carriage 40 sliding along rails 41 on a base 42. This mold, which may be reciprocated along rails 41 by suitable drive means or through intermittent entrainment by strip 2 against a restoring force, produces in strip 2 successive rows of blisters 6 which pass between guide ribs 21 of a support 25 as the strip moves horizontally through filling station B to sealing station C. Filling station B comprises a hopper from which the goods to be packaged are discharged via a feed channel 23 into the upwardly open blisters 6; the strip 2 then passes underneath a settling roller 24 which packs the goods into these blisters. In station C the loaded carrier strip 2 is engaged by a continuously driven transport roller 7 together with a cover strip 9, e.g. of aluminum foil, drawn from a supply reel 26 on a transmission housing 27. Strip 9, after passing around a deflecting roller 28, moves together with strip 2 between transport roller 7 and two counterrollers 29, 30 for hot lamination onto the strip 9 to form a composite tape 1 in whose blisters the goods are hermetically sealed against the atmosphere. An intermittently driven transport roller 8 downstream of roller 7 engages the tape 1 which forms a weighted loop 10 of variable length between the two rollers in order to accommodate differences in their instant speeds, as discussed above. Station D, which may be of the type described in my copending application Ser. No. 157,066 filed June 6, 1980, now U.S. Pat. No. 4,317,399, includes a cutting die 31 designed to sever a section with two rows of blisters 6 from tape 1 to form a package. Each package thus stamped from the tape is elevated by a plunger 32 into an overlying frame 33 to form a stack of such packages, these stacks being thereupon individually thrust by a horizontal plunger 34 onto a track 35; another plunger 36 then moves the oncoming stacks of packages along this track through station E, where they are provided with identifying legends, into a respective box drawn by a gripper 39 from a stacking device 38 at station F. A swingable arm 37 transports each box along another track 43 for closure and further handling.

A command post G controls the operation of a driving mechanism inside transmission housing 27 which actuates all the movable elements of the various stations in proper synchronism. The machine so far described corresponds to one disclosed in my copending application Ser. No. 341,332 of even date.

Figure 2:
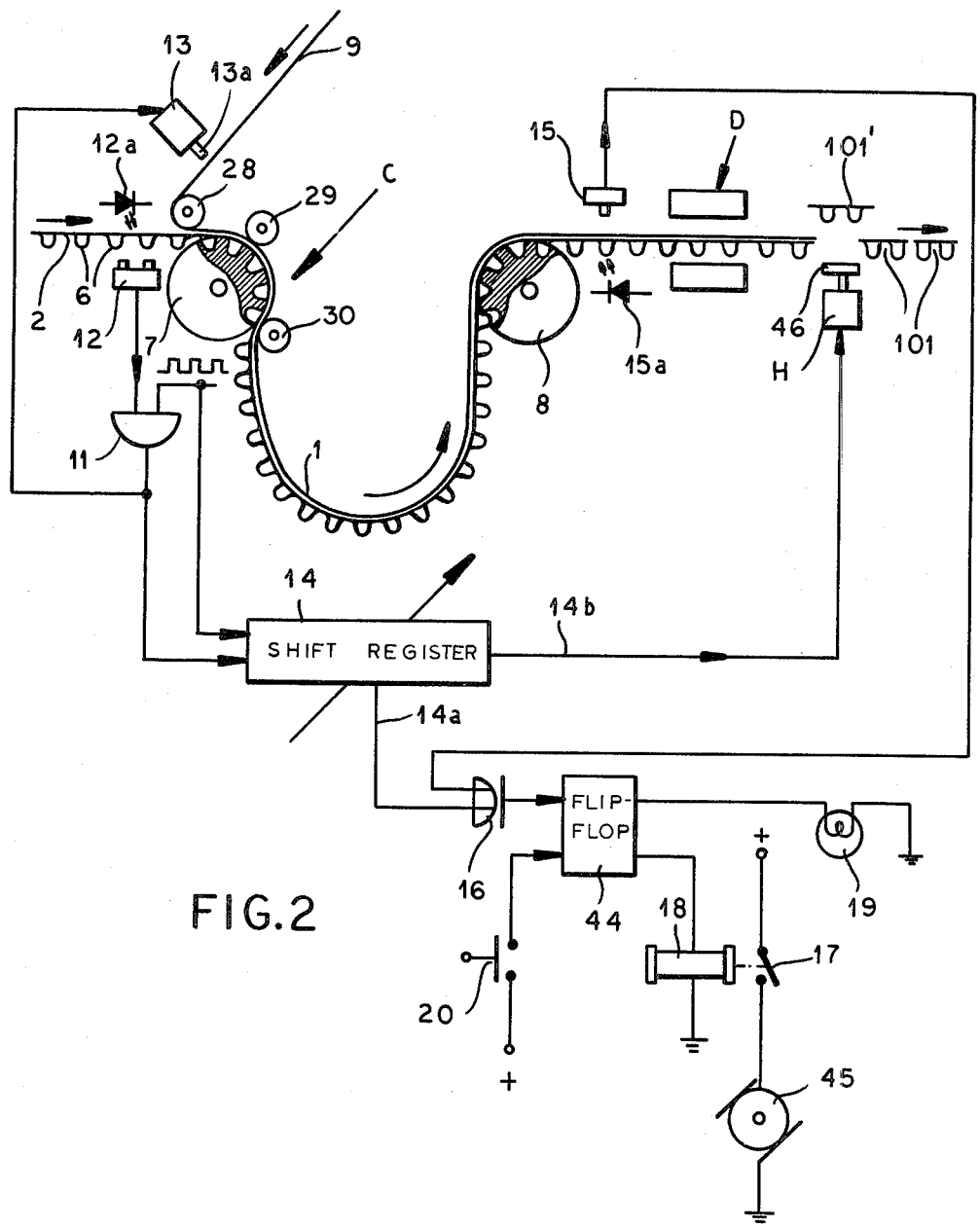
FIG. 2 is a circuit diagram relating to the operation of the monitoring system of FIG. 1.

A monitoring system for ascertaining operational irregularities comprises an upstream photodetector 12 disposed between settling roller 24 and sealing station C, a perforator 13 having a punch 13a trained upon the cover strip 9 at a location whose spacing from deflecting roller 28 is equal to the distance of that roller from photodetector 12, a downstream photodetector 15 disposed just beyond transport roller 8, and a sorter H controlling the operation of an ejector as described hereinafter with reference to FIG. 2.

With mold 5 assumed to shape four rows of blisters 6 at a time, roller 7 advances the strip 2 by four such rows during a fraction of a machine cycle during which the mold is closed and moves with the strip; during the remainder of each cycle the reopened mold is returned to its starting position. Roller 8, on the other hand, is assumed to advance the composite tape 1 at a rate of two rows of blisters at a time, twice per machine cycle, in keeping with the operating rhythm of cutting station D producing packages 101 (FIG. 2) of two rows each. A timing pulse may be periodically delivered to command post G by a cam switch tripped by a continuously rotating drive shaft in housing 27.

As illustrated in FIG. 2, the monitoring system further includes a component 11—here simply shown as an AND gate—emitting an error pulse whenever photodetector 12 senses the absence of goods in one or more blisters of a row passing thereover, such absence causing illumination of detector 12 by a light source 12a (shown as a light-emitting diode) through a suitable mask at the very instant when a timing pulse from command post G renders the gate 11 conductive. The error pulse issuing from gate 11 is transmitted to perforator 13, causing its punch 13a to make a hole in a confronting part of strip 9; in sealing station C that hole will come to lie between the two rows of blisters which are located above the photosensor 12 at the instant when the timing pulse is generated. The error pulse is also fed to a delay circuit in the form of a shift register 14 which is stepped by the timing pulses and has two outputs 14a and 14b connected to different stages thereof. Register 14 is preferably adjustable so that its outputs 14a and 14b can be selectively connected to any of several stages associated therewith. The error pulse loaded into the first stage reaches the stage connected to output 14a after a number of timing-pulse cycles measuring the time required for the incompletely filled pair of blister rows to pass from the upstream detector 12 to the downstream detector 15 by way of the weighted loop formed by the tape 1 between transport rollers 7 and 8.

When the hole punched in cover strip 9 appears opposite photodetector 15, light from another LED 15a traverses the tape 1 and gives rise to a reference pulse in the output of that detector. During normal operation, this reference pulse coincides with a control pulse appearing on register output 14a. The two pulses arrive at respective inputs of an Exclusive-OR gate 16 whose output is connected to a setting input of a flip-flop 44; the latter, in its reset state, energizes a relay 18 whose armature 17 closes an operating circuit for a motor 45 coupled with the driving mechanism inside transmission housing 27. A setting of flip-flop 44 by a trigger pulse from Ex-OR gate 16, indicative of an excessive shortening or lengthening of the loop of tape 1, deactivates the motor 45 and also energizes an alarm lamp 19 for the purpose of alerting the operator to the malfunction. A manual switch 20 can then be used to reset the flip-flop 44, thus restarting the machine after proper adjustments or corrections have been made.

Independently of any possible alarm signal emitted by flip-flop 44, output 14b of register 14 receives the delayed error pulse after a number of timing-pulse cycles measuring the interval required for the defective pair of blister rows to reach the location of sorter H. In the schematic representation of FIG. 2, a plunger 46 is shown to eject the defective package 101' from the normal path of regular packages 101 leaving the cutting station D. In the practical realization of FIG. 1, however, sorter H may operate to decouple the plunger 32 from its drive member so that the defective package is not lifted into frame 33 but leaves the cutting station C at a lower level together with marginal strip portions which are left of tape 1 after the packages have been stamped out therefrom.

The monitoring system described above could also be used with different packaging machines, as where the presence or absence of goods is to be checked on a carrier strip whose cells are not in the form of blisters.

I claim:

1. In a packaging machine in which goods loaded at a filling station into discrete cells of a progressively advancing carrier strip are enclosed therein at a sealing station preparatorily to a severing of individual packages of at least one cell each at a cutting station from said carrier strip, the sealed carrier cells being entrained by an upstream transporter beyond said filling station and by a downstream transporter ahead of said cutting station operating at the same average speed but in different modes, the carrier strip forming between said transporters a loop of variable length allowing for instantaneous speed differences, the combination therewith of a monitoring system for ascertaining irregularities in the operation of the machine, said monitoring system comprising:

first sensing means disposed between said filling station and said upstream transporter for detecting the presence of an empty cell in said carrier strip and generating an error signal in response thereto;

sorting means in a path of said packages following said cutting station for eliminating a defective package from said path in response to an error signal from said first sensing means;

delay means having an input connected to said first sensing means and a first output connected to said sorting means for deriving from said error signal a control pulse retarded with reference thereto by the time normally required to advance a cell from the location of said first sensing means to the location of said sorting means;

marking means ahead of said loop responsive to said error signal for applying a distinctive sign to said carrier strip in close proximity to an empty cell detected by said first sensing means;

second sensing means disposed between said loop and said cutting station for emitting a reference pulse upon detecting said distinctive sign;

anticoincidence means with respective inputs connected to said second sensing means and to a second sensing means and to a second output of said delay means ahead of said first output for normally receiving said reference pulse together with a control pulse derived by said delay means from said error signal; and alarm means triggerable by said anticoincidence means upon arrival of either of said pulse unaccompanied by the other.

2. The combination defined in claim 1 wherein said delay means comprises a shift register with different stages connected to said first and second outputs.

3. The combination defined in claim 1 or 2 wherein the cells of said carrier strip are closed by the bonding of a cover strip thereto at said sealing station, said marking means being positioned to apply said distinctive sign to said cover strip at a point spaced from said sealing station by a distance equal to the distance separating said sealing station from said first sensing means.

4. The combination defined in claim 3 wherein said carrier strip is light-transmissive and said cover strip is opaque, said marking means comprising a perforator adapted to punch a hole into said cover strip, said first and second sensing means comprising photodetectors responsive to light traversing an unfilled cell and a hole in said cover strip, respectively.

5. The combination defined in claim 1 or 2 wherein said anticoincidence means comprises an Exclusive-OR gate.

6. The combination defined in claim 1 or 2 wherein said cells are blisters projecting from said carrier strip, said transporters comprising roller with peripheral indentations engageable with said blisters for positively entraining said carrier strip.

* * * * *